Patented Feb. 23, 1943

2,311,633

UNITED STATES PATENT OFFICE 2,311,633

PROCESS OF PURIFYING FISH AND FISH LIVER OILS

James G. Blaso, East Elmhurst, N. Y., assignor, by direct and mesne assignments, to Natural Vitamins Corporation, a corporation of New Jersey No Drawing. Application February 8, 1940, Serial No. 318,002

7 Claims. (Cl. 260—420)

This invention relates to the deodorizing of fish oils and fish oil concentrates and relates particularly to the processing of vitamin-containing materials to remove fishy and oily odors and tastes.

It has been suggested to hydrogenate various animal and vegetable oils, particularly such oils as fish liver oils, to convert the unsaturated components which are the cause of the objectionable odors and tastes, into saturated higher melting oils which are thereafter cooled to precipitate the hydrogenated portion which can be removed, leaving behind a residual oil containing vitamin concentrates from which all or substantially all of the fishy odor and taste has been removed. It is found, however, that the hydrogenation process does not always remove all of the undesired odors and flavors and in some instances the hydrogenation procedure modifies the constituents previously without odor to cause them to have mild undesirable odors and flavors.

The present invention removes from oily materials generally the undesired constituents by a process of blowing with an inert gas at an elevated temperature, suitable gases being hydrogen, carbon dioxide, nitrogen and steam. The blowing may be conducted at elevated temperatures, especially when hydrogen is used either as the inert gas or when hydrogen is used as the hydrogenating agent in the presence of a hydrogenating catalyst.

Thus, an object of the invention is to remove from an oily material the substances which give it undesirable flavors and tastes.

Other objects and details of the invention will be apparent from the following description.

In practicing the invention, the desired oil, of which fish oils such as halibut liver oil, cod liver oil, and perkomorph oil or mixtures of these are representative examples, is cooled to about 15° to 20° C. and filtered to remove solid impurities in the raw oil. Similarly, vegetable oils such as corn, lettuce, wheat germ, etc. may be treated for their vitamin E content. An active nickel hydrogenating catalyst is prepared by suspending powdered nickel formate in a suitable oil such as cottonseed oil and treating the suspension with hydrogen at elevated temperatures ranging from 250° to 275° C. This procedure reduces the nickel formate to finely divided metallic nickel in suspension in the oil. To this suspension there may be added catalyst promoters such as aluminum powder and the prepared catalyst suspension in oil is then added to the filtered raw oil. The oil may be raised to a temperature ranging from room temperature to 35° to 45° C. At these temperatures, none of the vitamins A, D or E are destroyed. Hydrogen gas is then added to the reactor containing the oil preferably at substantially elevated pressures such as 50 lbs. per sq. in. The hydrogenation begins at about such temperatures and pressures and continues at good speed which may be aided and facilitated by a gentle stirring as by the use of a propeller type stirrer operating at speeds ranging from 200 to 400 R. P. M. The hydrogen pressure is desirably raised during the hydrogenation until a substantially elevated pressure range between 400 and 500 lbs. is reached; or the final hydrogenation pressure may be brought to values ranging from 600 to 2000 lbs. per sq. in. The hydrogenation and a portion at least of the stirring may be accomplished by bubbling the hydrogen through the heated oil and re-circulating the hydrogen from the top of the reactor through a cooling chamber or through an absorbent medium to purify the hydrogen and then returning the hydrogen to the reactor vessel. By this procedure substantial quantities of undesired substances are readily removed from the oil during the course of the hydrogenation reaction. At the close of the hydrogenation reaction the warm oil is removed from the reactor and filtered to remove the hydrogenation catalyst.

The filtered oil may then be subject to one or more of several alternative treatments. A desirable embodiment of the invention is found in the procedure of cooling the oil to a temperature of from 55° to 60° C. and blowing the moderately warm oil in this temperature range with the inert gas which, as above pointed out, may be hydrogen or may preferably be carbon dioxide, and may be nitrogen or even steam. When steam is used it is desirable that the blowing be accomplished in a vacuum sufficiently great to keep the steam in vapor form at the temperature of the oil or the temperature may be raised as high as 75° C. in order to retain the steam in vapor form at moderate vacuum. At the close of the blowing operation which removes substantially all of the hydrogenation odors and flavors, the hydrogenated oil may be cooled to temperatures ranging from 30° down to 15° or even lower, to 0° C. This cooling precipitates the stearic acid which is produced by the hydrogenation of the clupanodonic acid and other unsaturated fatty acid glycerides originally present in the fish oil. The resulting slurry may be centrifuged to separate a portion of the clear fluid oil or it may be filter pressed to remove the whole of the clear fluid oil, leaving behind a filter cake which is substantially wholly a hydrogenation product, mainly stearic acid with small amounts of occluded vitamins.

Alternatively, the filtered oil from the reactor may be cooled to temperatures ranging from 30° C. down to 20° C. or lower, as above outlined, to precipitate the stearic acid and the slurry may be filter pressed, as above indicated, to remove the hydrogenation products and the blowing may then be conducted upon the purified oil. In this embodiment a much wider range of temperature may be used since it is not necessary to keep the temperature above the value at which the stearic acid tends to precipitate and the oil may be brought to any desired temperature ranging from about 15° C. to about 75° C. and the desired inert gas, such as the carbon dioxide, nitrogen, or hydrogen, may be blown through the purified oil until the undesired hydrogenation odors are substantially completely removed. In this instance also steam may be used either at temperatures above 75° C. and reduced pressure, or at temperatures below 75° C. in a suitable vacuum.

In either embodiment, the blown filtered and purified oils are packaged in the desired manner. In the event that the oil being purified is a fish oil, it is desirable that the entire processing from the time the oil is placed in the hydrogenation reactor be conducted in non-oxidizing or air-free conditions, all of the handling being conducted in an atmosphere of either hydrogen, nitrogen or carbon dioxide.

Thus the process of the invention hydrogenates a crude or refined oil to remove an undesired portion thereof and thereafter or concomitant therewith blows the oil with an inert or suitable gas to remove from the oil, hydrogenation odors caused by volatile hydrogenation products, as well as other odors and tastes produced by volatile substances and impurities.

While there are above disclosed but a limited number of embodiments of the invention, it is possible to produce still other embodiments without departing from the inventive concept herein disclosed and it is therefore desired that only such limitations be imposed upon the appended claims as are stated therein or required by the prior art.

I claim:

1. The process of deodorizing fish oils comprising the steps of hydrogenating the oil under conditions of normal temperature and elevated pressure ranging from 20° C. to 45° C. and a pressure range above 50 lbs. and below 1000 lbs. per sq. in. in the presence of a hydrogenation catalyst, and blowing the hydrogenated oil with a non-reactive gas.

2. The process of deodorizing fish oils comprising the steps of hydrogenating the oil under conditions of normal temperature and elevated pressure ranging from 20° C. to 45° C. and a pressure range above 50 lbs. and below 1000 lbs. per sq. in. in the presence of a hydrogenation catalyst comprising active reduced nickel and blowing the hydrogenated oil with a non-reactive gas.

3. The process of purifying fish oils comprising in combination the steps of heating the oil to a temperature ranging from 20° C. to 45° C., treating it with hydrogen under pressures ranging from above 50 and below 1000 lbs. per sq. in. in the presence of a hydrogenation catalyst, filtering out the catalyst and thereafter blowing the filtered oil with carbon dioxide.

4. The process of purifying fish oils comprising in combination the steps of heating the oil to a temperature ranging from 20° to 45° C., treating it with hydrogen under pressures ranging from above 50 and below 1000 lbs. per sq. in. in the presence of a hydrogenation catalyst, filtering out the catalyst and thereafter blowing the filtered oil with nitrogen.

5. The process of purifying fish oils comprising in combination the steps of heating the oil to a temperature ranging from 20° C. to 45° C., treating it with hydrogen under pressures ranging from above 50 and below 1000 lbs. per sq. in. in the presence of a hydrogenation catalyst, filtering out the catalyst and thereafter blowing the filtered oil with steam.

6. The process of purifying fish oils comprising the steps of warming the oil and hydrogenating it by the application thereto of hydrogen under elevated pressure in the presence of a hydrogenation catalyst, at a temperature ranging between 20° C. and 45° C. and a pressure ranging from above 50 pounds to a value below 1000 pounds per square inch, filtering the oil to remove the catalyst, cooling the oil to precipitate hydrogenation products, filtering the oil to separate the hydrogenation products from an oily concentrate containing substantially all of the vitamin substances present in the original oil, and thereafter blowing the filtered oil with an inert gas to remove volatile hydrogenation odors and flavors.

7. The process of purifying fish oils comprising the steps of warming the oil and hydrogenating it by the application thereto of hydrogen under elevated pressure in the presence of a hydrogenation catalyst, at a temperature ranging between 20° C. and 45° C. and a pressure ranging from above 50 pounds to a value below 1000 pounds per square inch, filtering the oil to remove the catalyst, cooling the oil to precipitate hydrogenation products, filtering the oil to separate the hydrogenation products from an oily concentrate containing substantially all of the vitamin substances present in the original oil, and thereafter blowing the filtered oil with an inert gas selected from the group of hydrogen, carbon dioxide, nitrogen and steam.

JAMES G. BLASO.